(12) United States Patent
Guezelarslan et al.

(10) Patent No.: US 11,326,948 B2
(45) Date of Patent: May 10, 2022

(54) METHOD AND SYSTEM FOR GENERATING AN ELECTROMAGNETIC SIGNAL

(71) Applicant: Rohde & Schwarz GmbH & Co. KG, Munich (DE)

(72) Inventors: Baris Guezelarslan, Munich (DE); Dominik Hettich, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 142 days.

(21) Appl. No.: 16/689,951

(22) Filed: Nov. 20, 2019

(65) Prior Publication Data

US 2021/0148758 A1    May 20, 2021

(51) Int. Cl.
*G01J 3/28* (2006.01)
*G06T 11/20* (2006.01)

(52) U.S. Cl.
CPC ............ *G01J 3/2823* (2013.01); *G06T 11/206* (2013.01)

(58) Field of Classification Search
None
See application file for complete search history.

(56) References Cited

U.S. PATENT DOCUMENTS

| | | | | |
|---|---|---|---|---|
| 7,889,198 B2* | 2/2011 | Nara | ............... | G01R 13/029 345/440 |
| 2013/0335441 A1* | 12/2013 | Zalev | ............... | A61B 34/10 345/629 |
| 2014/0358477 A1* | 12/2014 | Keller | ............... | G06T 5/40 702/180 |

OTHER PUBLICATIONS

Tinkernut; "Hide Secret Messages in Audio;" YouTube Video; Jun. 14, 2011; pp. 1-5; https://www.youtube.com/watch?v=4LP6nDRbDOA (Year: 2011).*

Gram Schmalz; "Encoding Images as Sound & Decoding via Spectrogram;" captured by Wayback Machine Nov. 12, 2018; pp. 1-4; https://www.gramschmalz.com/encoding-images-as-sound-decoding-via-spectrogram/ (Year: 2018).*

* cited by examiner

*Primary Examiner* — Peter Hoang
(74) *Attorney, Agent, or Firm* — Christensen O'Connor Johnson Kindness PLLC

(57) ABSTRACT

A method for generating an electromagnetic signal is disclosed. The method comprises the following steps: An image having pixels is at least one of received and generated, wherein each one of the pixels has one of at least two different pixel values. At least one of a spectrogram of an electromagnetic signal and characteristic parameters of the electromagnetic signal is determined based on at least one of the image and the pixel values. The electromagnetic signal is generated based on at least one of the spectrogram and the characteristic parameters.

21 Claims, 2 Drawing Sheets

METHOD AND SYSTEM FOR GENERATING AN ELECTROMAGNETIC SIGNAL

FIELD OF THE DISCLOSURE

Embodiments of the present disclosure generally relate to a method for generating an electromagnetic signal. Embodiments of the present disclosure further relate to a signal generator system.

BACKGROUND

Devices that can generate electromagnetic signals with a predefined and/or desired shape are known from the state of the art. For example, such signals can be generated via special kinds of signal generators, for instance so-called arbitrary waveform generators (AWGs).

Usually, these signals are constructed in time domain and then generated via the signal generator. However, it may be difficult to correctly generate signals having a desired frequency distribution and/or a frequency distribution, as the respective features (in frequency domain) have to be described in time domain. Typically, this is complicated for the respective user or rather operator to mentally transfer the respective features intended into the time domain so as to set the signal generator appropriately.

This becomes even more complicated when the respective features vary over time.

Accordingly, there is a need for a method for generating an electromagnetic signal as well as for a signal generator system that allow for generating electromagnetic signals with a varying spectrum in a more convenient and simple fashion.

SUMMARY

Embodiments of the present disclosure provide a method for generating an electromagnetic signal. In some embodiments, the method comprises the following steps: An image having pixels is received and/or generated, wherein each one of the pixels has one of at least two different pixel values. A spectrogram of an electromagnetic signal and/or characteristic parameters of the electromagnetic signal is/are determined based on the image and/or the pixel values. The electromagnetic signal is generated based on the spectrogram and/or the characteristic parameters.

The spectrogram essentially describes the evolution of the frequency composition of the electromagnetic signal over time, i.e. the evolution of the spectrum over time.

The method according to the disclosure is based on a certain representation of the spectrogram, namely the so-called "heat map" or waterfall diagram representation, which is a two-dimensional graphic representation.

Generally, the spectrogram relates to a visual representation of the spectrum of frequencies of a respective signal as it varies with time. Thus, the spectrogram relates to the frequency-time domain.

More precisely, the method according to the disclosure is based on the idea that as the spectrogram can be unambiguously represented by an image, a respective image can also be unambiguously translated into a spectrogram. A desired spectrogram of the electromagnetic signal can easily be generated by generating an image corresponding to the heat map representation of the spectrogram.

Moreover, a time dependence of the spectrum can be implemented in a simple manner by appropriately manipulating the image.

Generally, the steps of receiving and/or generating the image having pixels as well as determining the spectrogram and/or the characteristic parameters of the electromagnetic signal are done by an image module.

The step of generating the electromagnetic signal is done by a signal generator module.

At least one processor, also called a processor circuit or processing unit, may be assigned to the image module and/or the signal generator module, wherein the processor is configured to process the image and/or its pixel values or rather the spectrogram and/or the characteristic parameters.

According to an aspect of the disclosure, the pixel values are associated with a color of the pixel. Accordingly, the color of the respective pixel can be used to determine the spectrogram at least partially and/or the characteristic parameters. Moreover, image recognition techniques could be used to automatically determine the value of the pixels.

In a certain embodiment of the present disclosure, image coordinates of the pixels are associated with a frequency of the electromagnetic signal and with a time coordinate, respectively. Accordingly, the coordinates of the pixels in the image are respectively interpreted as frequency values and time values of the corresponding spectrogram. This way, a time dependence of the spectrogram can easily be implemented by varying the value of certain pixels along the image axis corresponding to the time axis, for instance the y-axis of the two-dimensional image.

In a further embodiment of the present disclosure, the pixel values are associated with a value of the spectrogram. Thus, the value, for example the color of the respective pixel, represents the respective value of the spectrogram at the specific frequency and time represented by the pixel position. For instance, the value may relate to the strength or rather the power density of the electromagnetic signal at the specific frequency and time represented by the pixel position.

Accordingly, a single pixel comprises three different kinds of information, namely frequency and time due to the position of the pixel as well as strength or rather power density due to the pixel value, for example its color.

The characteristic parameters may comprise at least one of a global central frequency, a local central frequency, a global frequency bandwidth, a local frequency bandwidth and a modulation scheme. These are typically the parameters that are needed to characterize an electromagnetic signal.

Therein and in the following, the term "global" is understood to mean "in the whole relevant spectrum", while the term "local" is understood to mean "in a sub-spectrum smaller than the overall relevant spectrum", namely a portion of the entire spectrum.

In some embodiments, sets of characteristic parameters are identified, for example several central frequencies with associated bandwidths and/or modulation schemes. Such sets typically correspond to different contributions to the electromagnetic signal.

According to another aspect, an IQ-signal and/or a time domain signal is generated based on the spectrogram and/or the characteristic parameters. Thus, respective electromagnetic signal may comprise information on both of their amplitude and their phase. Alternatively or additionally, the signal may relate to a simple time domain signal without any phase information.

According to a further aspect, an inverse Fourier transform is applied to the spectrogram in order to generate the electromagnetic signal. More precisely, an inverse Fourier transform is applied to the frequency dependence of the spectrogram, which directly gives the corresponding electromagnetic signal in time domain and its evolution over time. The inverse Fourier transform transfers the spectrogram, namely the image, into the time domain.

In some embodiments, an inverse fast Fourier transform is performed, which can be done in a for example fast manner with low computational costs.

In one embodiment of the present disclosure, the characteristic parameters are determined based on the spectrogram. Thus, the pixel values of the image are first translated or rather converted into the corresponding spectrogram and the characteristic parameters are only then determined based on the determined spectrogram. Thus, the characteristic parameters are determined based on a knowledge of the actual frequency distribution of the electromagnetic signal over time.

Alternatively or additionally, the characteristic parameters are determined directly based on the image. In some embodiments, image processing techniques are applied to the image in order to determine the characteristic parameters of the electromagnetic signal. For example, the image module may comprise an artificial neural network that is trained to determine the characteristic parameters directly based on the image. Of course, any other type of suitable machine learning technique and/or classical image processing technique may be performed in order to determine the characteristic parameters.

According to another aspect of the present disclosure, several partial signals of the electromagnetic signal are determined based on at least one of the spectrogram and the characteristic parameters. Different partial signals may be associated with different characteristic parameters, e.g. different central frequency, bandwidth, and/or modulation scheme. Alternatively or additionally, the different partial signals may be associated with different portions of the spectrogram. Thus, individual contributions to the electromagnetic signal are identified rather than just generating the resulting superposition of all the partial signals.

In a further embodiment of the present disclosure, each one of the several partial signals is generated via a separate signal generator module. Thus, each one of the signal generator modules may be associated with a certain set of characteristic parameters. Moreover, the individual signal generator modules may be adapted to fit the set of characteristic parameters. Likewise, each one of the signal generator modules is associated with a certain portion of the spectrogram or may be adapted to recreate the portion of the spectrogram.

However, the several partial signals may also be generated by the same signal generator module, for instance subsequently.

According to an aspect of the present disclosure, the image is generated via a graphical user interface (GUI). In other words, a user can conveniently modify the image and thus the spectrogram via the GUI, which may influence the electromagnetic signal generated later. Therein, the user may interact with the GUI in any suitable way known from the state of the art. For example, the GUI may be associated with a touch screen and/or gesture recognition means. Alternatively or additionally, the user may interact with the GUI via command means such as a knob, a button, a keyboard and a mouse.

The GUI may be generated by a processor, processor circuit or processor unit, which is assigned to the signal generator system.

The graphical user interface may comprise tools being configured to selectively manipulate pixels of the image being associated with a specific type of electromagnetic signal. Thus, a specific tool can be selected in order to add a signal having a desired central frequency, bandwidth, modulation scheme, etc. This way, signals having certain desired properties can be added to the spectrogram in a for example simple and convenient fashion, as the user or operator may use the tool(s).

For instance, brushes or drawing elements are provided that can be used to draw the image via the GUI.

The respective drawing elements that can be incorporated or rather inserted easily via the GUI may relate to specific signals having desired properties.

As mentioned above, the user or operator may simply select one of the drawing elements and place the selected drawing element in the image. As each of the drawing elements relate to a certain predefined signal, the user or operator has selected a certain predefined signal to be created.

This respective signal can be further modified by the GUI, for example the specific tools provided, for instance the brush.

In general terms, the user can generate the image by using predefined image portions, namely the drawing elements, wherein the user may further modify the image by changing single pixel values of the image. The final image is interpreted so as to obtain information of the specific electromagnetic signal to be created.

Therefore, the steps mentioned above result in the at least one electromagnetic signal to be created.

Accordingly, an electromagnetic signal may be constructed individually that will be generated.

According to a certain embodiment, the user may draw the image, for instance by means of the GUI. For simplifying purposes, the user may select a certain predefined image portion assigned to a certain predefined signal. However, the respective image portion can be modified by the user in order to construct the intended electromagnetic signal.

The image received/generated is processed internally by the signal generator system, for instance a processor or processing unit of the signal generator system. The internal processing corresponds to analyzing the image in order to determine the spectrogram or rather the characteristic parameters.

The specific processing unit may be involved previously in displaying the GUI via which the user creates the image such that this processing unit generates the image based on inputs of the user via the GUI.

Once the spectrogram or rather the characteristic parameters have been determined, the signal generator system generates the electromagnetic signal based on the image received and processed, namely the spectrogram and/or the characteristic parameters derived from the image.

Embodiments of the present disclosure further provide a signal generator system, comprising an image module and at least one signal generator module. The image module is configured to receive and/or generate an image having pixels, wherein each one of the pixels has one of at least two different pixel values. The image module is configured to determine a spectrogram of an electromagnetic signal and/or characteristic parameters of the electromagnetic signal based on the image and/or the pixel values. The at least one signal generator module is configured to generate the electromagnetic signal based on the spectrogram and/or the characteristic parameters.

As already explained above, the spectrogram essentially describes the evolution of the frequency composition of the electromagnetic signal over time, i.e. the evolution of the spectrum over time.

The signal generator system according to the disclosure is based on a certain representation of the spectrogram, namely the so-called "heat map" or waterfall diagram representation, which is a two-dimensional graphic representation.

More precisely, the signal generator system according to the disclosure is based on the idea that the spectrogram can be unambiguously represented by an image, an image can also be unambiguously translated into a spectrogram. A desired spectrogram of the electromagnetic signal can easily be generated by generating an image corresponding to the heat map representation of the spectrogram.

Moreover, a time dependence of the spectrum can be implemented in a simple manner by appropriately manipulating the image.

In some embodiments, the signal generator system is configured to perform the method for generating an electromagnetic signal described above.

Regarding the remaining advantages and properties of the signal generator system, reference is made to the explanations given above with respect to the method for generating an electromagnetic signal described above, which also hold for the signal generator system and vice versa.

Each of the image module and the signal generator module may be established as hardware and/or software.

Thus, the image module, the signal generator module and/or the signal generator system may comprise or be established as a computer program comprising program code that are adapted to cause the signal generator system to perform the method for generating an electromagnetic signal described above, when the computer program is executed on a processor (e.g., microprocessor, ASIC, FPGA, SOC, hardware circuits, etc.), for example, the central processing unit, of the signal generator system.

According to an aspect of the present disclosure, the image module comprises an image generation module being configured to generate the image. In other words, the image generation module is configured to manipulate an existing image and/or to create a new image.

In another embodiment of the present disclosure, the image module comprises a graphical user interface (GUI). In other terms, the image module comprises a processor or rather processing unit as well as a display connected with the processor. The GUI is generated by the processor that forwards the respective signals to the display to display the GUI. Via the GUI, a user can conveniently modify the image and thus the spectrogram and the generated electromagnetic signal. Therein, the user may interact with the GUI in any suitable way known from the state of the art. For example, the GUI may be associated with a touch-sensitive display, also called touch screen, and/or gesture recognition means. Alternatively or additionally, the user may interact with the GUI via command means such as a knob, a button, a keyboard and/or a mouse.

The graphical user interface may comprise tools being configured to selectively manipulate pixels of the image being associated with a specific type of electromagnetic signal, for instance audio, video, text and/or facsimile. Thus, a specific tool can be selected in order to add a signal having a desired central frequency, bandwidth, modulation scheme, etc. This way, signals having certain desired properties can be added to the spectrogram in a particularly simple and convenient fashion.

The signal generator system may comprise a user device and at least one signal generator unit, wherein the user device and the signal generator unit are connected to each other in a signal transmitting manner, wherein the user device comprises the image module, and wherein the at least one signal generator unit comprises the at least one signal generator module. The user device may be established as an oscilloscope, an arbitrary waveform generator, a computer, a laptop, a smart phone, any other kind of smart device and/or software. Likewise, the at least one signal generator unit may be established as an arbitrary waveform generator, a computer, a laptop, a smart phone, any other kind of smart device and/or software.

The signal generator system may comprise several signal generator units that each comprise at least one signal generator module.

According to another aspect of the present disclosure, the user device and the at least one signal generator unit are connected to each other via at least one of internet, a local network, and a local wireless connection, e.g. Bluetooth, low-energy Bluetooth etc.

The signal generator network may be established as an actual physical network of physical signal generator units, wherein the individual signal generator units may be connected to each other and/or to the user device via internet, a local network and/or local wireless connections, such as WLAN, Bluetooth, low-energy Bluetooth etc.

Alternatively, the signal generator network may be established as a virtual network of virtual signal generator units. In this case, the signal generator units are established as software blocks, wherein the individual software blocks are connected with one another via suitable interfaces.

However, the signal generator network may also be established as a mixture of actual physical signal generator units and virtual signal generator units.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
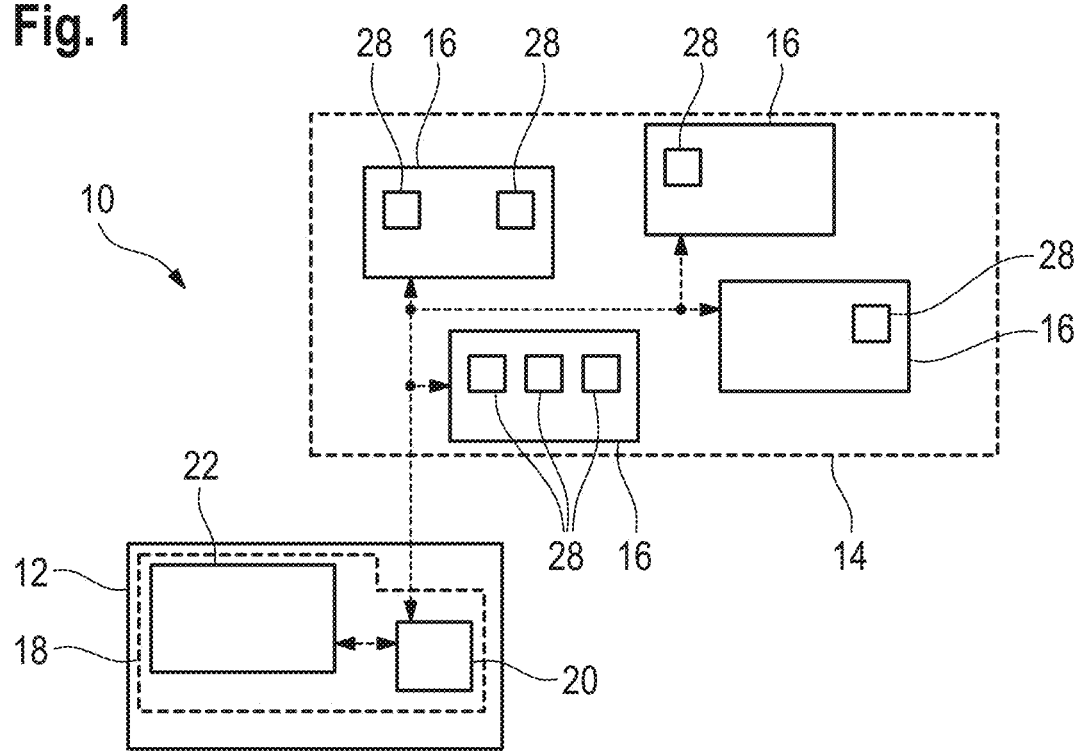
FIG. 1 schematically shows an example of a signal generator system according to the present disclosure.

FIG. 1 shows a signal generator system 10 comprising a user device 12 and a signal generator network 14 comprising several signal generator units 16. The user device 12 is connected to the signal generator network 14, for example to the individual signal generator units 16 in a signal transmitting manner.

The user device 12 is established as an oscilloscope, an arbitrary waveform generator, a computer, a laptop, a smart phone, any other kind of smart device and/or software. Likewise, the signal generator units 16 may each be established as an arbitrary waveform generator, a computer, a laptop, a smart phone, any other kind of smart device and/or software.

It is noted that the user device 12 and the signal generator units 16 may also be integrated into a single device (having a single housing encompassing the respective components), e.g. into a single oscilloscope, computer, laptop, smart phone, any other kind of smart device, as appropriate with suitable software.

The user device 12 comprises an image module 18 with an image generation module 20 and a graphical user interface (GUI) 22 that may be provided by the image generation module 20.

Therein and in the following, the term "module" is understood to denote components that are established as hardware and/or software, as is appropriate in the respective context.

Figure 2:
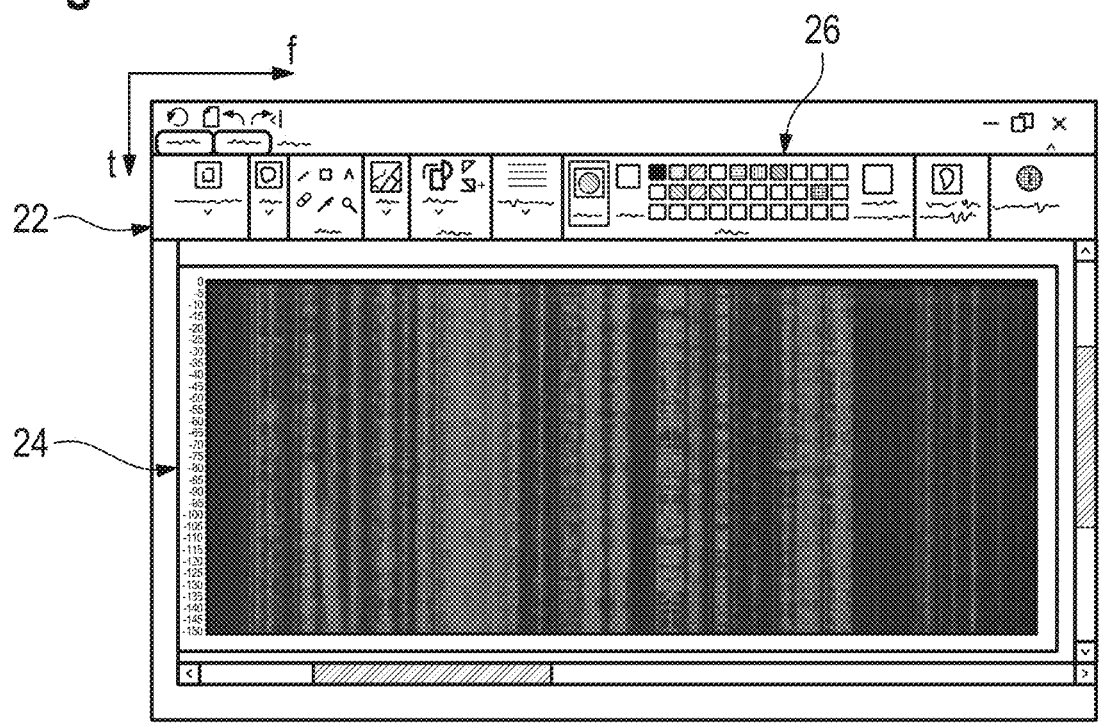
FIG. 2 schematically shows an example of a graphical user interface of the signal generator system of FIG. 1.

FIG. 2 shows the GUI 22 in more detail. The GUI 22 comprises an image section 24 and a tool section 26 via which tools can be selected as will be described later in more detail.

The signal generator network 14 may be established as an actual physical network of physical signal generator units 16, wherein the individual signal generator units 16 may be connected to each other and/or to the user device 12 via internet, a local network and/or local wireless connections, such as WLAN, Bluetooth, low-energy Bluetooth etc.

Alternatively, the signal generator network 14 may be established as a virtual network of virtual signal generator units 16. In this case, the signal generator units 16 are established as software blocks, wherein the individual software blocks are connected with one another via suitable interfaces.

The signal generator units 16 each comprise one or several signal generator modules 28. It is noted that one, several or all of the signal generator units 16 may be completely established as software modules. In that case, the respective signal generator unit 16 may be identical to the respective signal generator module 28.

Generally speaking, the signal generator system 10 is configured to determine a spectrogram of an electromagnetic signal based on an image and to generate the electromagnetic signal based on the image.

Figure 3:
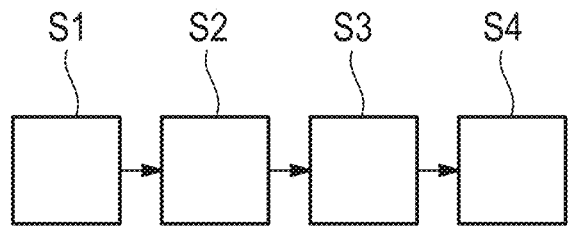
FIG. 3 shows a flow chart of an example method for generating an electromagnetic signal according to a first embodiment of the present disclosure.

More precisely, the signal generator system 10 is configured to perform a method for generating an electromagnetic signal that is described in the following with reference to FIG. 3.

First, an image is received and/or generated by the image module 18 and/or the image generation module 20 (step S1). Herein, the term "received and/or generated" is understood to comprise the following possibilities: The image may be stored in a memory of the user device 12 and may be loaded into the image module; the image may be received from a device other than the user device 12, for example via internet local network or a local wireless connection; a received image may be manipulated by the image module 18 and/or the image generation module 20.

In some embodiments, pre-generated images may be stored in a cloud service and may be loaded into the image module 18. Alternatively or additionally, a user of the user device 12 may manipulate the image or even create a completely new image via the GUI 22 so as to generate the image. For this purpose, several tools are provided in the tool section 26 simplifying the generation of the image via the GUI 22.

Therein, the user may interact with the GUI 22 in any suitable way. For example, the GUI 22 may be displayed on a touch-sensitive display, also called a touch screen, on which the user may interact to adapt/generate the image appropriately. Alternatively or additionally, the GUI 22 may be assigned to gesture recognition means configured to recognize any gestures of the user to generate the image or rather adapt the image. Alternatively or additionally, the user may interact with GUI 22 via command means such as a knob, a button, a keyboard and a mouse.

As will be explained in more detail below, the image is associated with a spectrogram of an electromagnetic signal. In the example of FIG. 2, the horizontal axis, also called x-axis, corresponds to a frequency f of the electromagnetic signal, while the vertical axis, also called y-axis, is associated with the time t.

Accordingly, the tool section 26 may comprise special tools that allow the user to add a certain type of signal in a particularly convenient manner.

An exemplary image is depicted in the image section 24 of the GUI 22. The image comprises or rather consists of several pixels that are arranged in a two-dimensional fashion, as is shown in FIG. 2. Each one of the several pixels has a pixel value, wherein there are at least two different pixel values. More precisely, the pixel value of each pixel is associated with a color of the respective pixel. Thus, the number of possible pixel values is equal to the number of colors the pixels can attain.

As already mentioned above, the image is associated with a spectrogram of an electromagnetic signal. One common representation of such a spectrogram is a so-called waterfall diagram, sometimes also called "heat map", wherein the frequency is associated with one coordinate axis (y-axis), the time is associated with the other coordinate axis (x-axis), and a value of the spectrogram at the respective time and frequency is represented by a color of the respective pixel. The value may relate to the strength or rather power density of the electromagnetic signal.

Thus, the image that is generated and/or received in step S1 is a graphical representation of the spectrogram of an electromagnetic signal.

Generally speaking, the next step is to generate an electromagnetic signal that is associated with the spectrogram that corresponds to the received and/or generated image. There are several different possibilities to achieve this, some of which will be explained in the following. It is noted that these examples are not meant to be exhaustive.

According to a first embodiment of the method, a spectrogram is determined based on the image, more precisely based on the several pixel values provided in the image (step S2).

Accordingly, the coordinates of the pixels are respectively interpreted as frequency and time values of the respective signal(s), while the pixel values, in particular the color of the respective pixel, is interpreted as a value of the spectrogram, for instance strength or rather power density of the signal(s). In other words, the image is directly converted into the associated spectrogram based on the positions and on the colors of the pixels.

Finally, an inverse Fourier transform is applied to the spectrogram with respect to its frequency coordinate, such that the time domain electromagnetic signal(s) corresponding to the spectrogram is obtained (step S3). In some embodiments, an inverse Fast Fourier transform is applied to the spectrogram in order to obtain the electromagnetic signal in time domain. The generated electromagnetic signal may then be forwarded to the user device 12 (step S4).

As mentioned above, the signal generator network 14 may also be integrated within the user device 12 such that the generated electromagnetic signal is internally forwarded from the signal generator network 14 to the image generation module 20.

Figure 4:
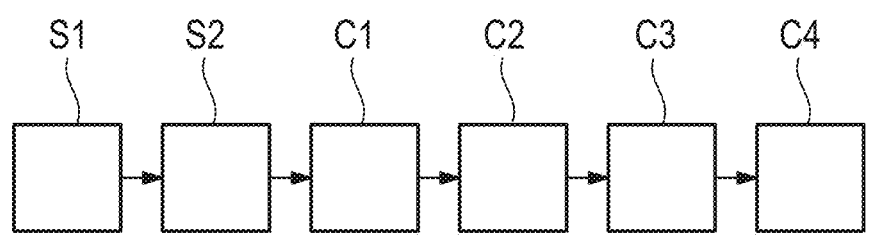
FIG. 4 shows a flow chart of n example method for generating an electromagnetic signal according to a second embodiment of the present disclosure.

According to a second embodiment of the method shown in FIG. 4, the spectrogram is determined like explained above regarding the first embodiment of the method.

Based on the determined spectrogram, characteristic parameters of the electromagnetic signal are determined (step C1). Therein, the characteristic parameters may comprise one or more of the following quantities: a global central frequency, a local central frequency, a global frequency bandwidth, a local frequency bandwidth and a modulation scheme Therein and in the following, the term "global" is understood to mean "in the whole relevant spectrum", while the term "local" is understood to mean "in a sub-spectrum smaller than the overall relevant spectrum".

The electromagnetic signal to be generated may correspond to a superposition of several different partial signals, e.g. of several signals having different central frequencies, bandwidths and/or modulation schemes.

In some embodiments, sets of characteristic parameters are identified, for example several central frequencies with associated bandwidths and/or modulation schemes.

Thus, by determining the characteristic parameters, the individual partial signals are identified.

These sets of characteristic parameters associated with the individual partial signals are then forwarded to the signal generator units 16 (step C2).

Therein, one set of characteristic parameters is associated with one of the signal generator modules 28. This means that the respective characteristic parameters may be respectively only forwarded to one of the signal generator modules 28 or that one of the signal generator modules 28 may be adapted to the respective set of characteristic parameters.

The individual partial signals are then each generated via one of the signal generator modules 28 (C3). Thus, the parameters of the individual generator modules 28 are adapted based on the characteristic parameters such that they generate the respectively associated partial signal.

Each of the partial signals may be an IQ-signal, i.e. the individual partial signals may comprise information on both of their amplitude and their phase, and/or a simple time domain signal.

Finally, the partial signals generated by the individual signal generator modules 28 may be forwarded to the user device 12 and superposed to generate the electromagnetic signal (step C4).

Alternatively, the partial signals may first be superposed and the resulting electromagnetic signal may be forwarded to the user device 12.

Figure 5:
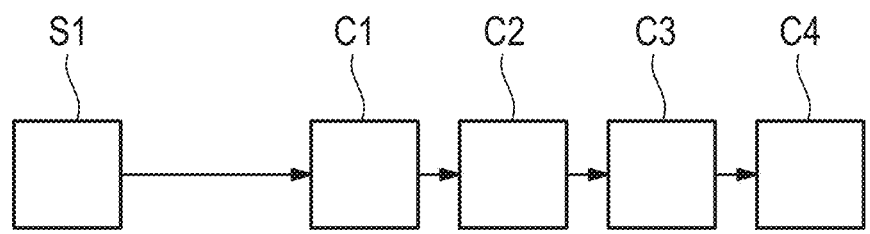
FIG. 5 shows a flow chart of an example method for generating an electromagnetic signal according to a third embodiment of the present disclosure.

FIG. 5 shows a flow chart of a third embodiment of the method for generating the electromagnetic signal. The method according to the third embodiment is basically identical to the method according to the second embodiment, but with one difference:

Instead of determining the spectrogram and then determining the characteristic parameters based on the spectrogram, the characteristic parameters are determined directly based on the image or rather the pixel values.

In some embodiments, image processing techniques are applied to the image in order to determine the characteristic parameters of the electromagnetic signal directly.

For example, the image module 18 may comprise an artificial neural network that is trained to determine the characteristic parameters directly based on the image received as input.

Of course, any other type of suitable machine learning technique and/or classical image processing technique may be performed in order to determine the characteristic parameters.

All of the methods described above provide a particularly convenient way of generating an electromagnetic signal (in time domain) whose spectrum varies over time. The respective spectra and their time evolution can simply be drawn into the image.

This way, varying spectra and even time gaps in the electromagnetic signal can be implemented in a particularly simple way.

The signal generator system 10 automatically "translates" the image (associated with frequency domain) into the corresponding electromagnetic signal in time domain. Furthermore, the signal generator system 10 ensures that the signal generator units 16 are parameterized appropriately to generate the at least one electromagnetic signal that corresponds to the respective image.

As described above, the image module, the signal generator module and/or other components of the signal generator system, or other components based on the context provided, may include, in some embodiments, logic for implementing the technologies and methodologies described herein. This logic of these components can be carried out in either hardware or software, or a combination of hardware and software. In some embodiments, one or more of these components includes one or more computing devices such as a processor (e.g., a microprocessor), a central processing unit (CPU), a digital signal processor (DSP), an application-specific integrated circuit (ASIC), a fieldprogrammable gate array (FPGA), or the like, or any combinations thereof, and can include discrete digital or analog circuit elements or electronics, or combinations thereof.

In an embodiment, one or more of these components includes a microprocessor and a memory storing logic modules and/or instructions. In an embodiment, one or more of these components includes one or more ASICs having a plurality of predefined logic components. In an embodiment, one or more of these components includes one or more FPGA having a plurality of programmable logic components. In an embodiment, one or more of these components includes hardware circuit implementations (e.g., implementations in analog circuitry, implementations in digital circuitry, and the like, and combinations thereof). In an embodiment, one or more of these components includes combinations of circuits and computer program products having software or firmware instructions stored on one or more computer readable memories that work together to cause a device to perform one or more methodologies or technologies described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for generating an electromagnetic signal, comprising the following steps:
   at least one of receiving and generating an image having pixels, wherein each one of said pixels has one of at least two different pixel values;
   determining a spectrogram of an electromagnetic signal and characteristic parameters of said electromagnetic signal based on at least one of said image or said pixel values, wherein said characteristic parameters comprise a modulation scheme, such that the modulation scheme of the electromagnetic signal is determined based on at least one of said image or said pixel values; and
   generating said electromagnetic signal based on said spectrogram and said characteristic parameters.

2. The method of claim 1, wherein said pixel values are associated with a color of said pixel.

3. The method of claim 1, wherein image coordinates of said pixels are associated with a frequency of the electromagnetic signal and with a time coordinate, respectively.

4. The method of claim 1, wherein said pixel values are associated with a value of said spectrogram.

5. The method of claim 1, wherein said characteristic parameters comprise at least one of a global central frequency, a local central frequency, a global frequency bandwidth, or a local frequency bandwidth.

6. The method of claim 1, wherein at least one of an IQ-signal and a time domain signal is generated based on at least one of said spectrogram and said characteristic parameters.

7. The method of claim 1, wherein an inverse Fourier transform is applied to said spectrogram in order to generate said electromagnetic signal.

8. The method of claim 1, wherein said characteristic parameters are determined based on said spectrogram.

9. The method of claim 1, wherein said characteristic parameters are determined directly based on said image.

10. The method of claim 1, wherein several partial signals of the electromagnetic signal are determined based on at least one of said spectrogram and said characteristic parameters.

11. The method of claim 10, wherein each one of the several partial signals is generated via a separate signal generator module.

12. The method of claim 1, wherein said image is generated via a graphical user interface.

13. The method of claim 12, wherein said graphical user interface comprises tools being configured to selectively manipulate pixels of the image being associated with a specific type of electromagnetic signal.

14. A signal generator system, comprising an image circuit and at least one signal generator circuit,
   said image circuit being configured to at least one of receive and generate an image having pixels, wherein each one of said pixels has one of at least two different pixel values;
   said image circuit being configured to determine a spectrogram of an electromagnetic signal and characteristic parameters of said electromagnetic signal based on at least one of said image and said pixel values, wherein said characteristic parameters comprise a modulation scheme, such that the image circuit is configured to determine the modulation scheme of the electromagnetic signal based on at least one of said image or said pixel values; and
   said at least one signal generator circuit being configured to generate said electromagnetic signal based on said spectrogram and said characteristic parameters.

15. The signal generator system according to claim 14, wherein each of the image circuit and the signal generator circuit is established as hardware and/or software.

16. The signal generator system of claim 14, wherein said image circuit comprises an image generation circuit being configured to generate said image.

17. The signal generator system of claim 16, wherein said image circuit comprises a graphical user interface.

18. The signal generator system of claim 17, wherein said graphical user interface comprises tools being configured to selectively manipulate pixels of the image being associated with a specific type of electromagnetic signal.

19. The signal generator system of claim 14, comprising a user device and at least one signal generator, wherein the user device and the signal generator are connected to each other in a signal transmitting manner,
   wherein the user device comprises said image circuit, and wherein said at least one signal generator comprises said at least one signal generator circuit.

20. The signal generator system of claim 19, wherein said user device and said at least one signal generator are connected to each other via at least one of internet, a local network, or a local wireless connection.

21. A method for generating an electromagnetic signal, comprising:
   at least one of receiving or generating an image having pixels, wherein each one of said pixels has one of at least two different pixel values;
   determining a spectrogram of an electromagnetic signal and characteristic parameters of said electromagnetic signal based on at least one of said image or said pixel values, wherein said characteristic parameters are determined directly based on said image, wherein said characteristic parameters comprise a modulation scheme, such that the modulation scheme of the electromagnetic signal is determined based on at least one of said image or said pixel values; and
   generating said electromagnetic signal based on said spectrogram and said characteristic parameters.

* * * * *